April 18, 1967    F. MARGOLIS ETAL    3,314,089
MACHINE FOR PRODUCING IMITATED NORMAL HARD
BOOK COVERS AND METHOD THEREFOR
Filed Oct. 14, 1965    12 Sheets-Sheet 4
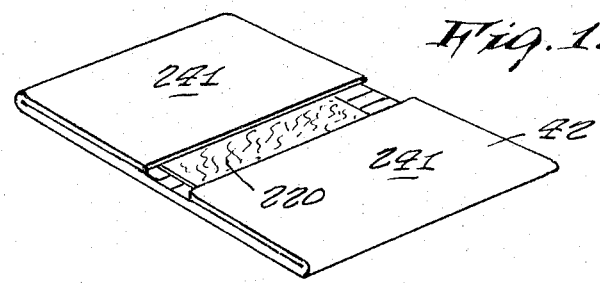
Fig. 13
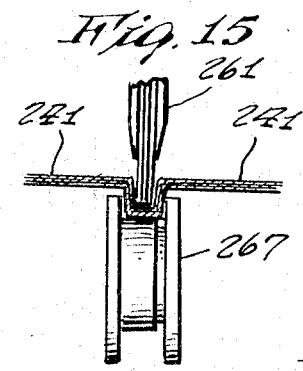
Fig. 15
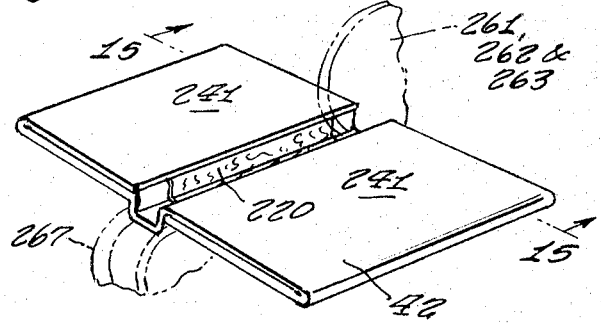
Fig. 14
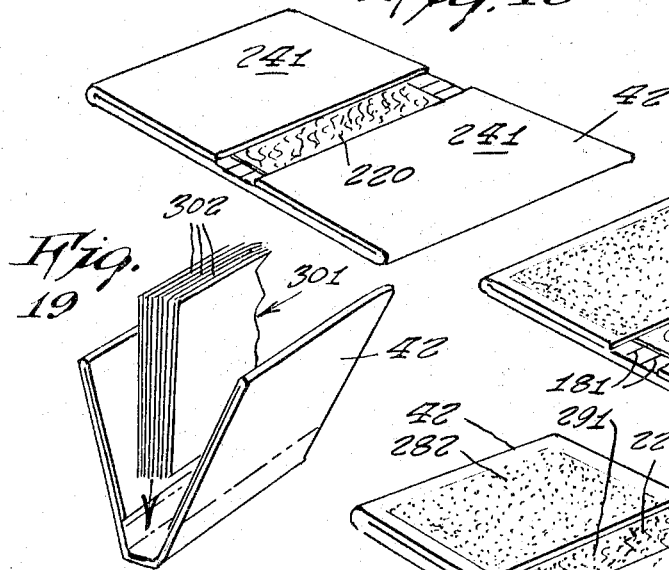
Fig. 16
Fig. 19
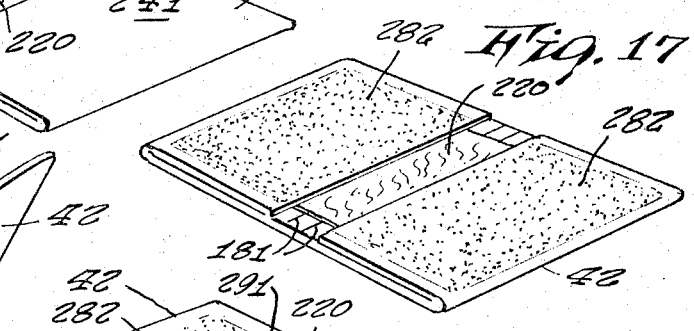
Fig. 17
Fig. 18
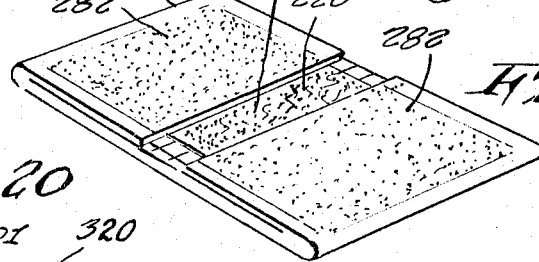
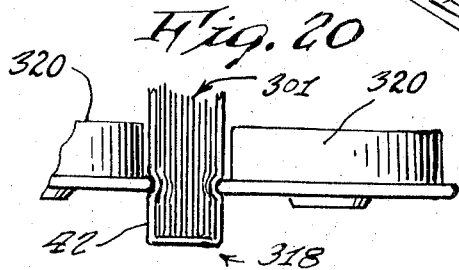
Fig. 20
INVENTORS
FAY MARGOLIS &
FRIEDA MARGOLIS
BY
Carl Miller
ATTORNEY April 18, 1967 F. MARGOLIS ETAL 3,314,089
MACHINE FOR PRODUCING IMITATED NORMAL HARD
BOOK COVERS AND METHOD THEREFOR
Filed Oct. 14, 1965 12 Sheets-Sheet 5
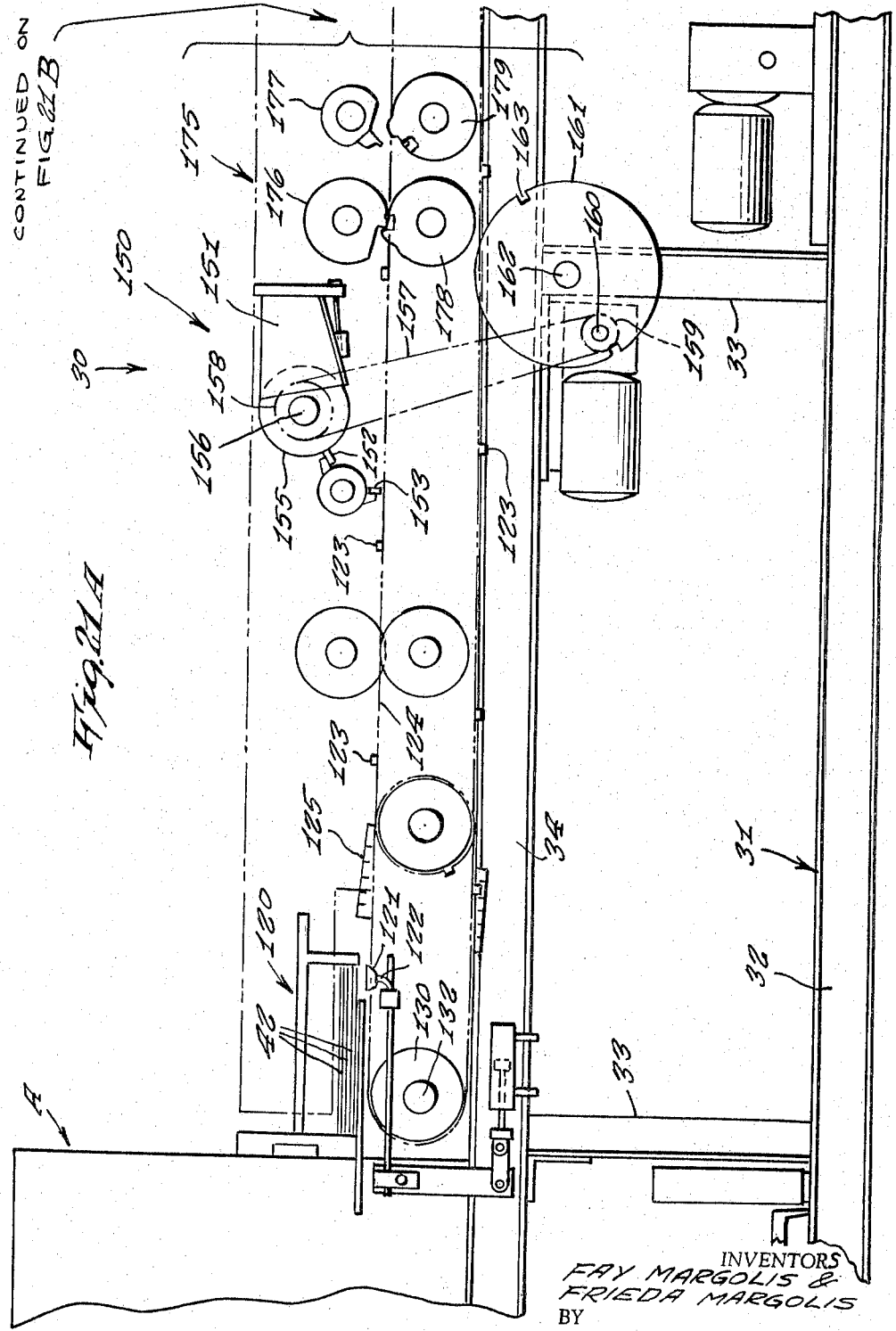
INVENTORS
FAY MARGOLIS &
FRIEDA MARGOLIS
BY
Carl Miller
ATTORNEY

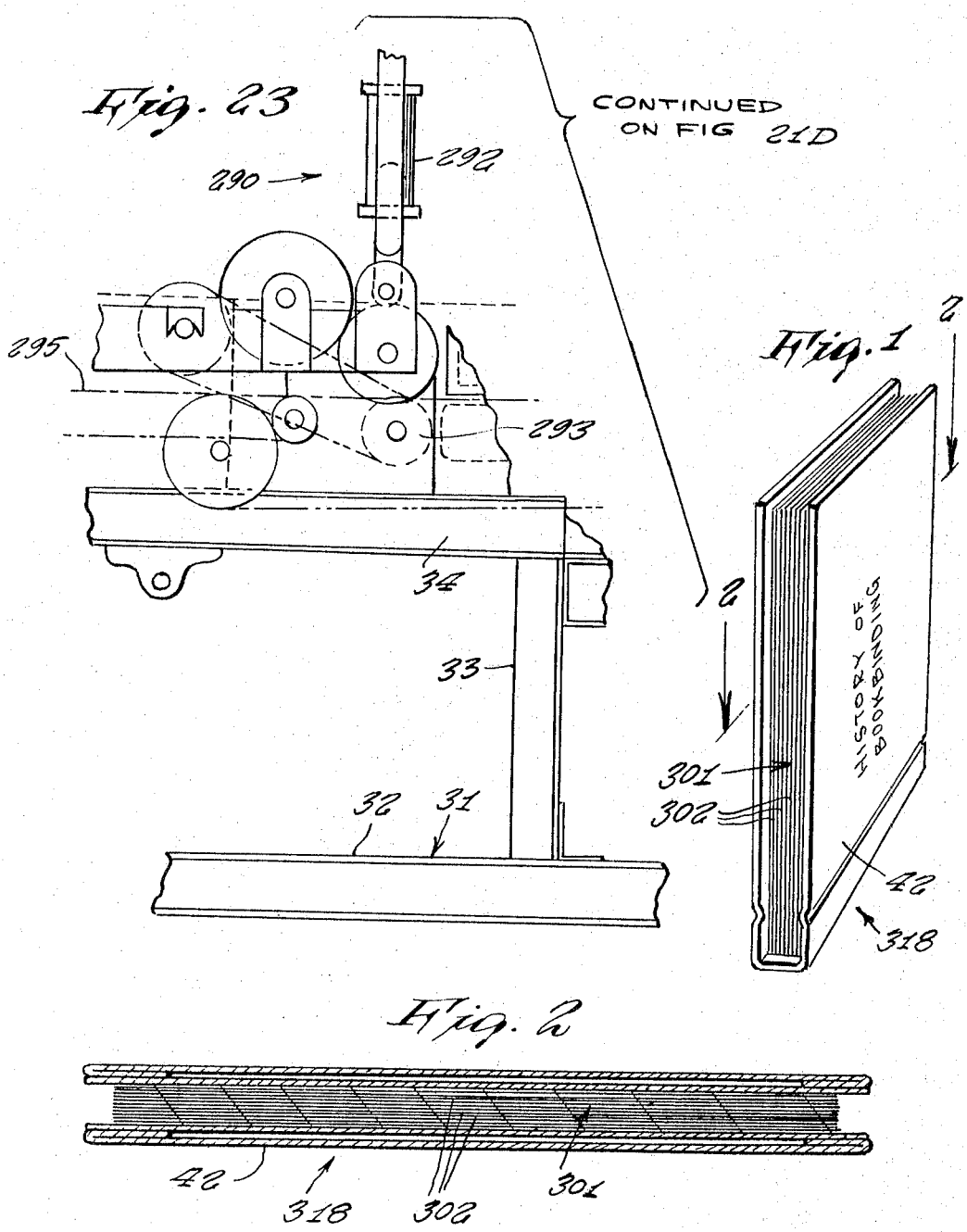

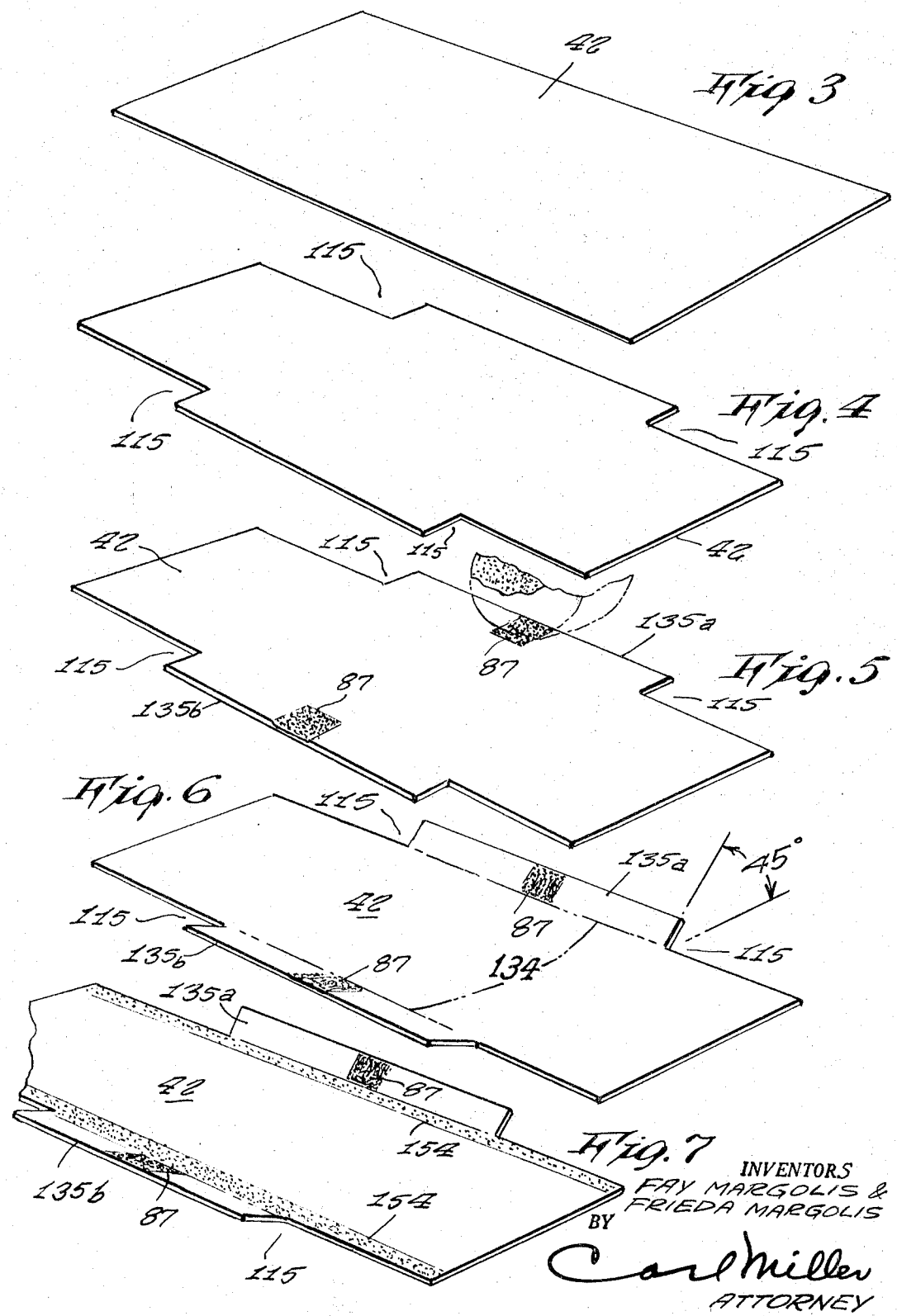

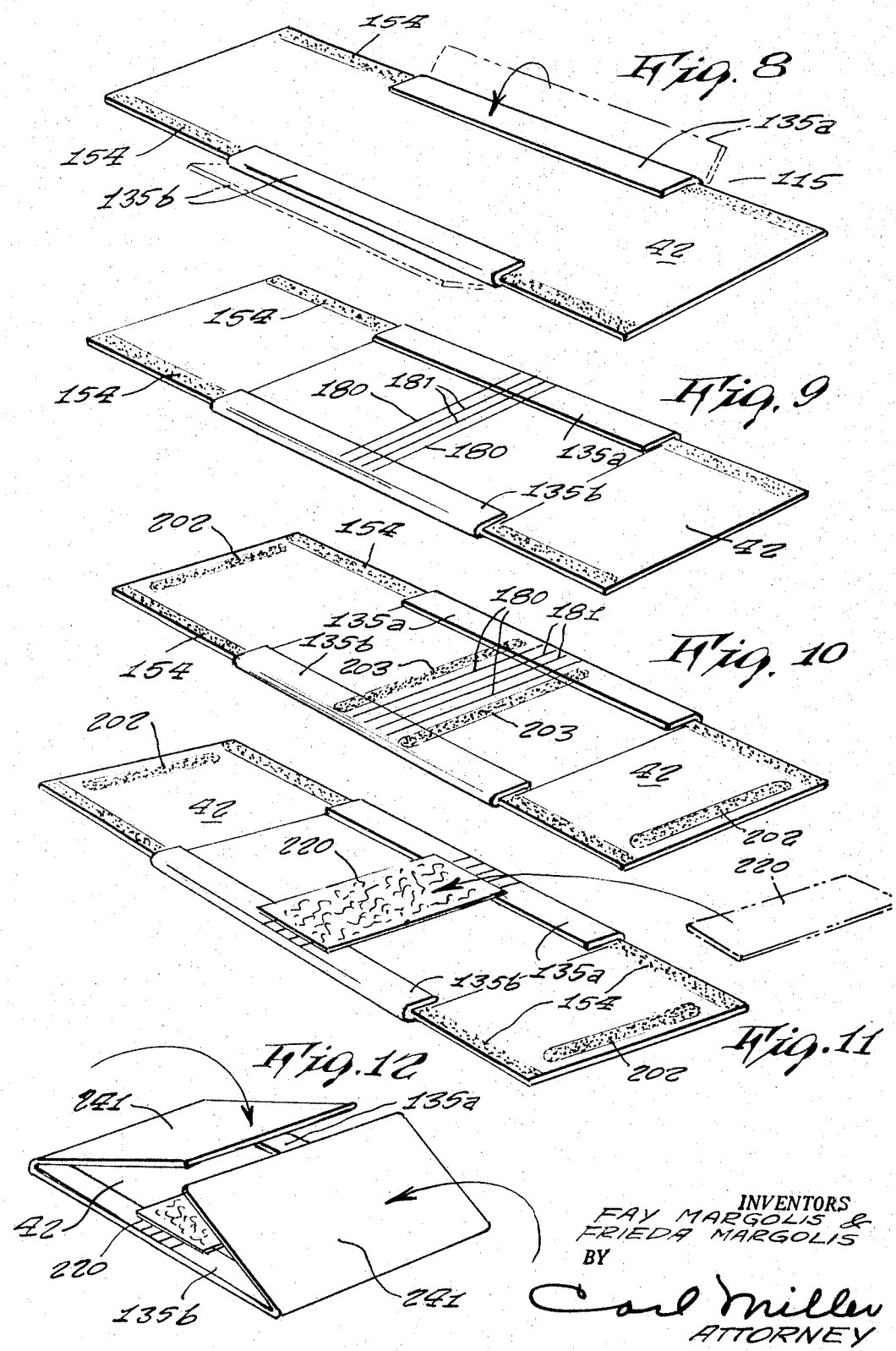

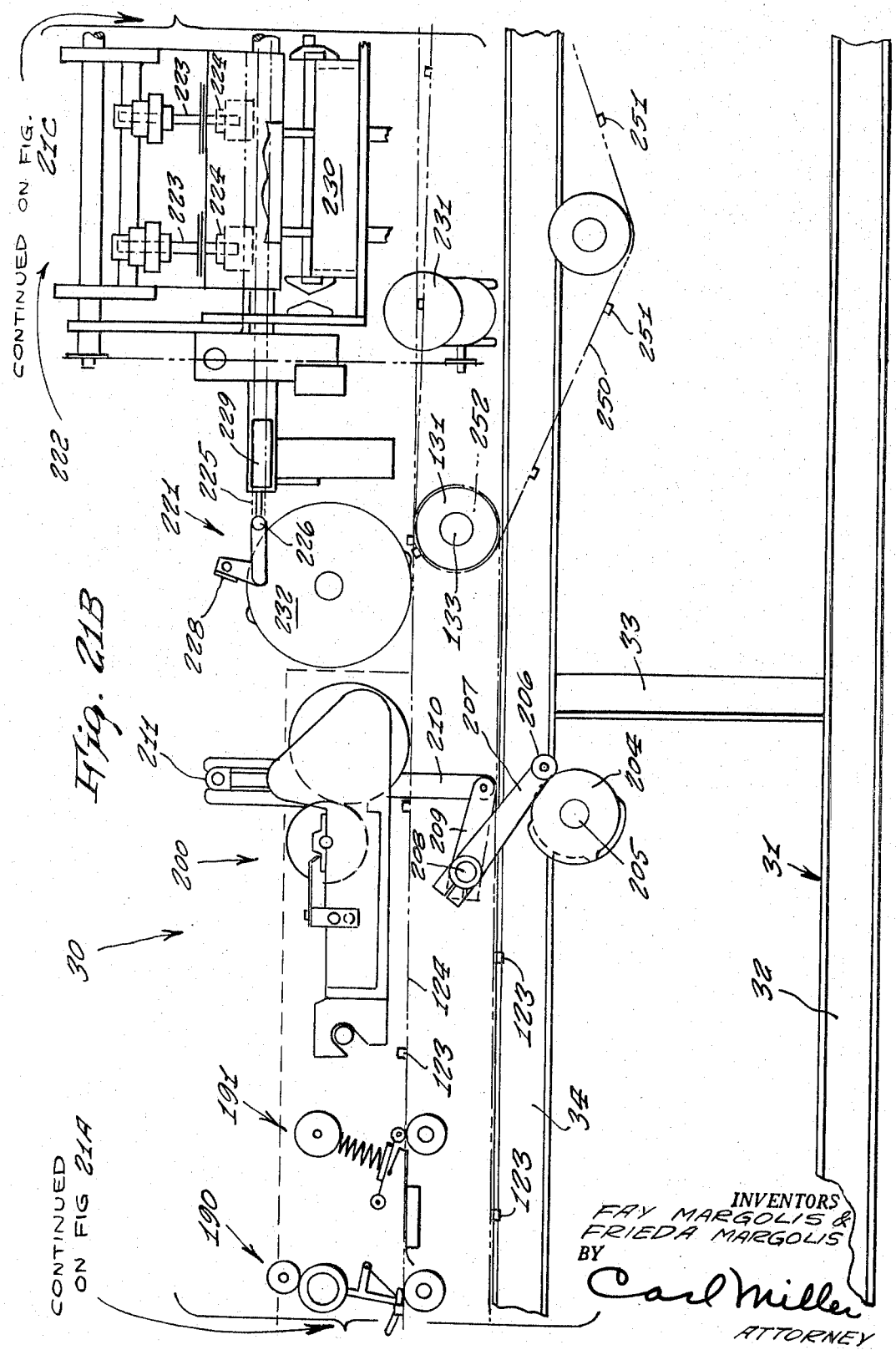

April 18, 1967

F. MARGOLIS ETAL 3,314,089

MACHINE FOR PRODUCING IMITATED NORMAL HARD
BOOK COVERS AND METHOD THEREFOR

Filed Oct. 14, 1965

INVENTORS
FAY MARGOLIS &
FRIEDA MARGOLIS
BY
Carl Miller
ATTORNEY

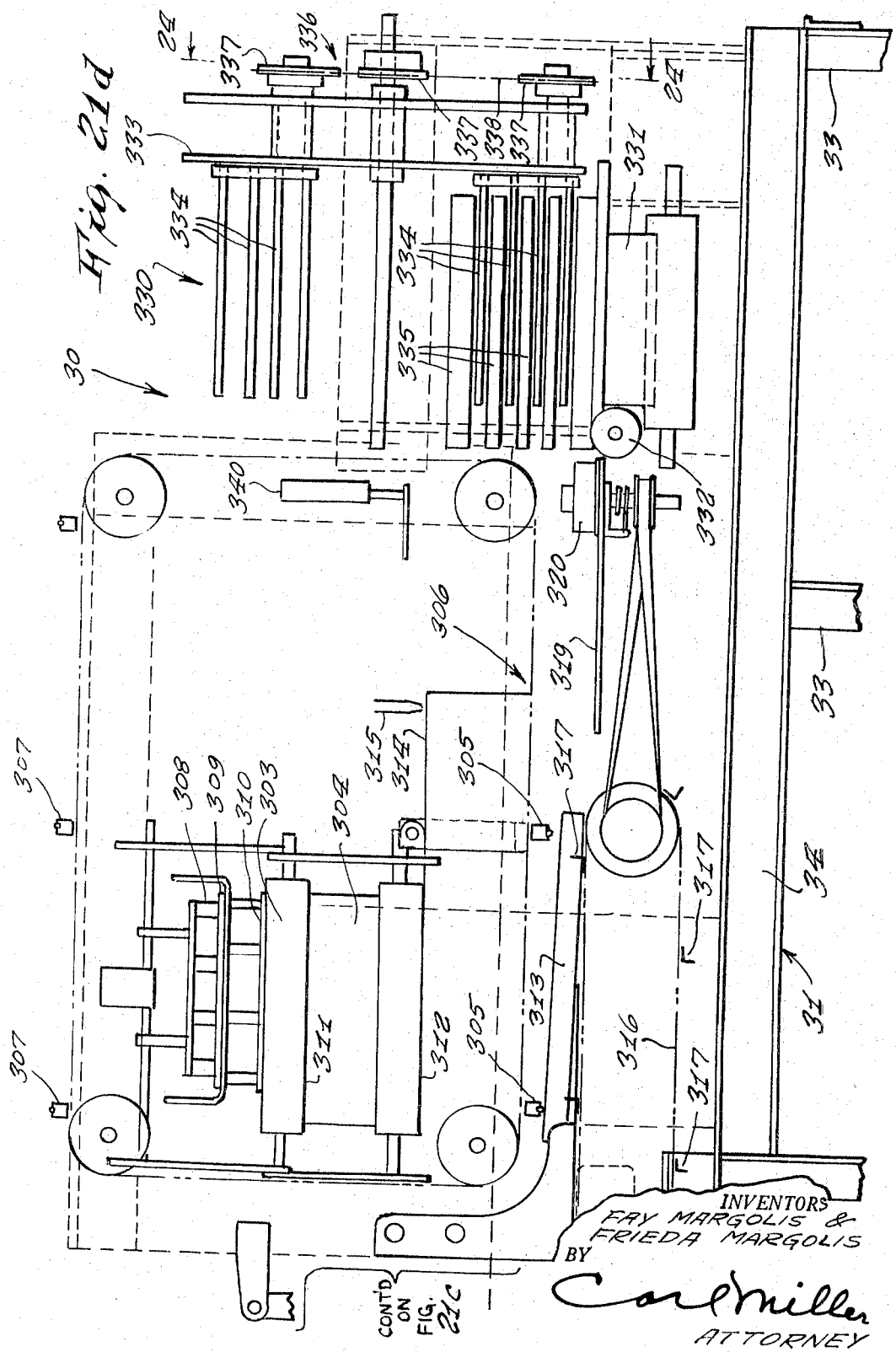

April 18, 1967

F. MARGOLIS ETAL 3,314,089

MACHINE FOR PRODUCING IMITATED NORMAL HARD
BOOK COVERS AND METHOD THEREFOR

Filed Oct. 14, 1965

INVENTORS
FAY MARGOLIS &
FRIEDA MARGOLIS
BY
Carl Miller
ATTORNEY

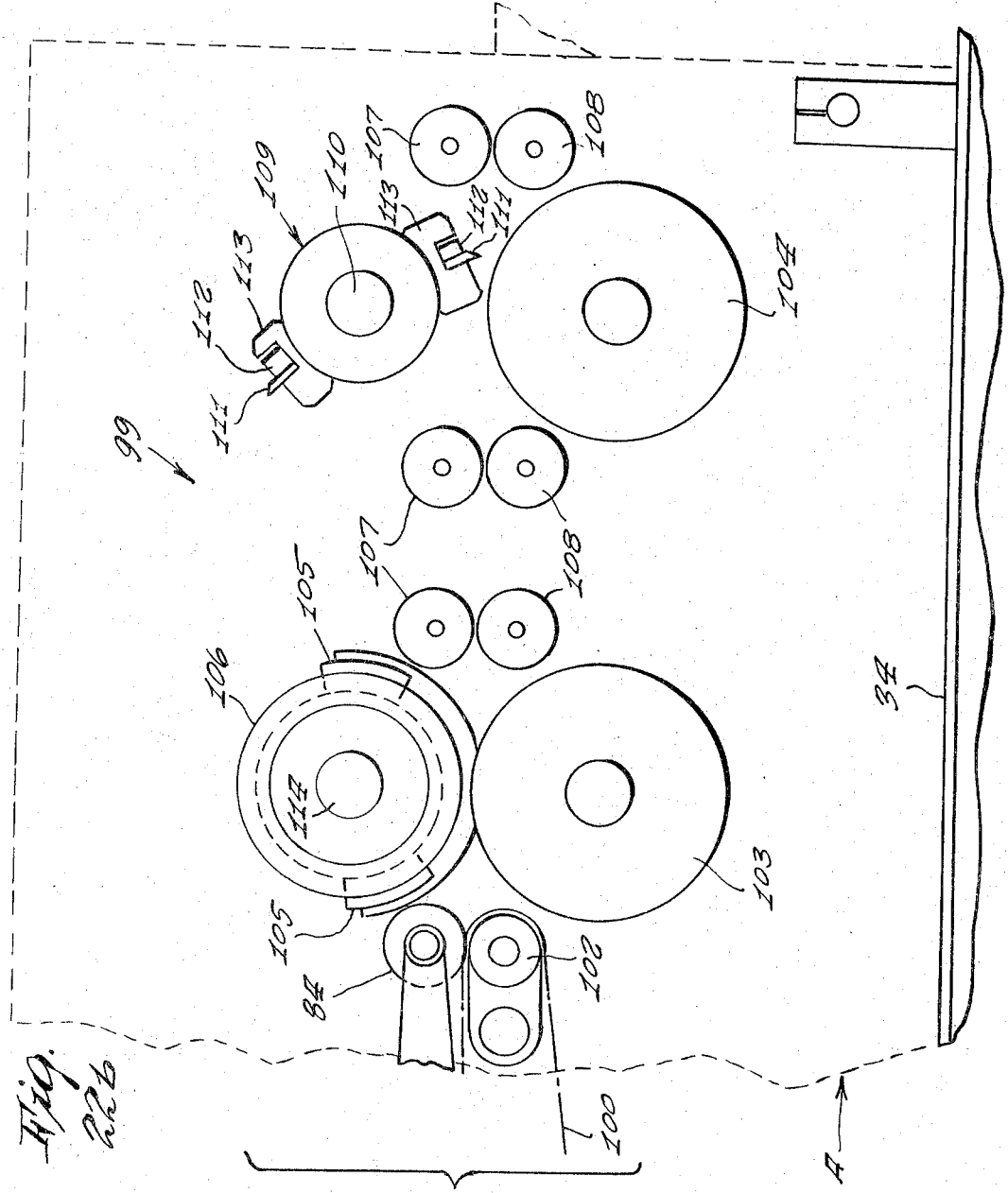

INVENTORS
FAY MARGOLIS &
FRIEDA MARGOLIS
BY Carl Miller
ATTORNEY

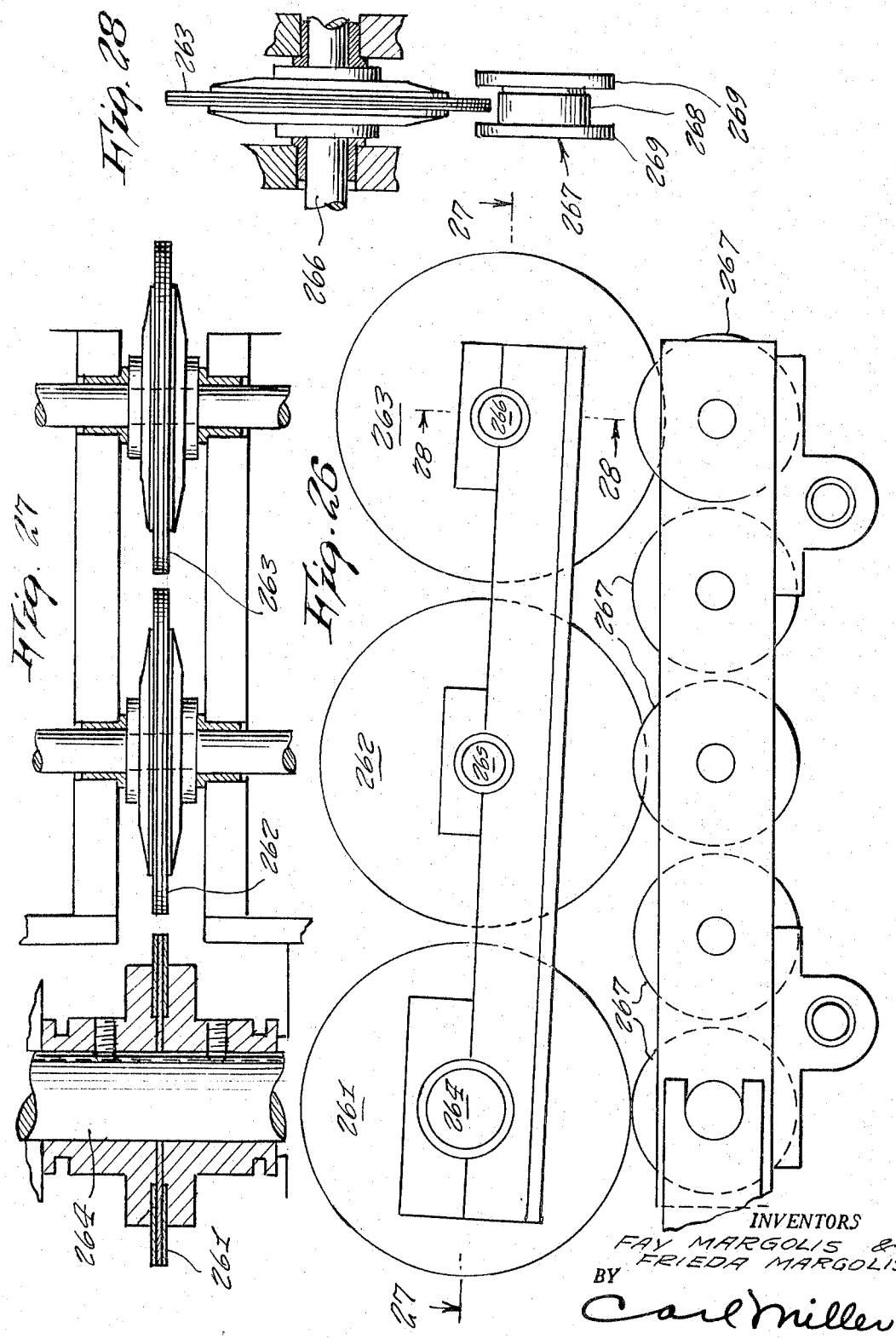

United States Patent Office 3,314,089
Patented Apr. 18, 1967

3,314,089
MACHINE FOR PRODUCING IMITATED NORMAL HARD BOOK COVERS AND METHOD THEREFOR
Fay Margolis and Frieda Margolis, both of New York, N.Y.; said Fay Margolis assignor to New York Business Development Corporation, Albany, N.Y., a corporation of New York
Filed Oct. 14, 1965, Ser. No. 496,074
20 Claims. (Cl. 11—2)

This invention relates generally to the art of book manufacturing. More specifically, it relates to book covers and the method for manufacture of the same.

It is generally well known to those skilled in the art that the production of hard cover books is relatively expensive. A part of the increased cost in such production is due to the material used for the hard cover. Such material is of relatively heavy weight paper or mill boards which cost considerably more than light weight cardboards, such increased costs being added to the retail cost of the final product. Accordingly, there has been introduced upon the market in the past several years, the well-known paper back book which retails at a relatively low price far below the cost of comparable hard cover books. Such paper back books include a cover made of flexible light weight cardboard which is sized or plasticized on its outer side, and which is of the same size as the book pages because the cover edges would become quickly bent and wrinkled if made larger than the book pages. Such paper back books thus do not have the appearance of a quality book and are recognized as of cheap production quality. Accordingly, there is a need on the market at this time for the production of books having the quality appearance of hard cover books, yet which will be made of cover materials costing considerably less than conventional heavy paper boards, thereby resulting in a book that can be more competitively marketed against the paper back books. Such books would include novel covers which are disclosed in prior Patent No. 3,169,029, granted Feb. 9, 1965, to Morris Margolis and prior pending application, Ser. No. 324,354, filed Nov. 18, 1963, now Patent No. 3,231,296, by Fay Margolis, the present application being for a machine and method for production of the same.

Accordingly, a principal object of the present invention is to provide a machine for manufacture of imitated normal hard book covers having self-contained means to form a book cover having hard book cover characteristics, yet which is formed from relatively thin cardboard, and wherein the machine will receive a sheet of the thin cardboard and perform all operations thereupon for discharging the same, fully formed into a book cover having hard book cover characteristics.

Another object is to provide a machine for manufacture of imitated normal hard book covers wherein all the operations upon the cardboard sheet are performed automatically and in automatic sequence without any normal manual attention.

Another object is to provide a machine for manufacture of imitated normal hard book covers wherein the machine will additionally automatically secure the manufactured book cover to a body of book pages passing through the present machine, thereby delivering a completed book at its output end.

Still another object of the present invention is to provide a method or novel sequence of operations used by the machine for changing the cardboard sheet to a fully formed book cover.

A yet farther object is to provide a machine that will produce imitated normal hard book covers at a faster rate than by the conventional method of hand casing.

These and other objects will be readily evident upon a study of the following specification and the accompanying drawings wherein:

FIGURE 1 is a perspective view of a fully assembled book having a book cover formed by the present machine;

FIGURE 2 is a cross-sectional view taken on line 2—2 of FIGURE 1 shown looking into the direction of the arrows thereof;

Figure 22A:
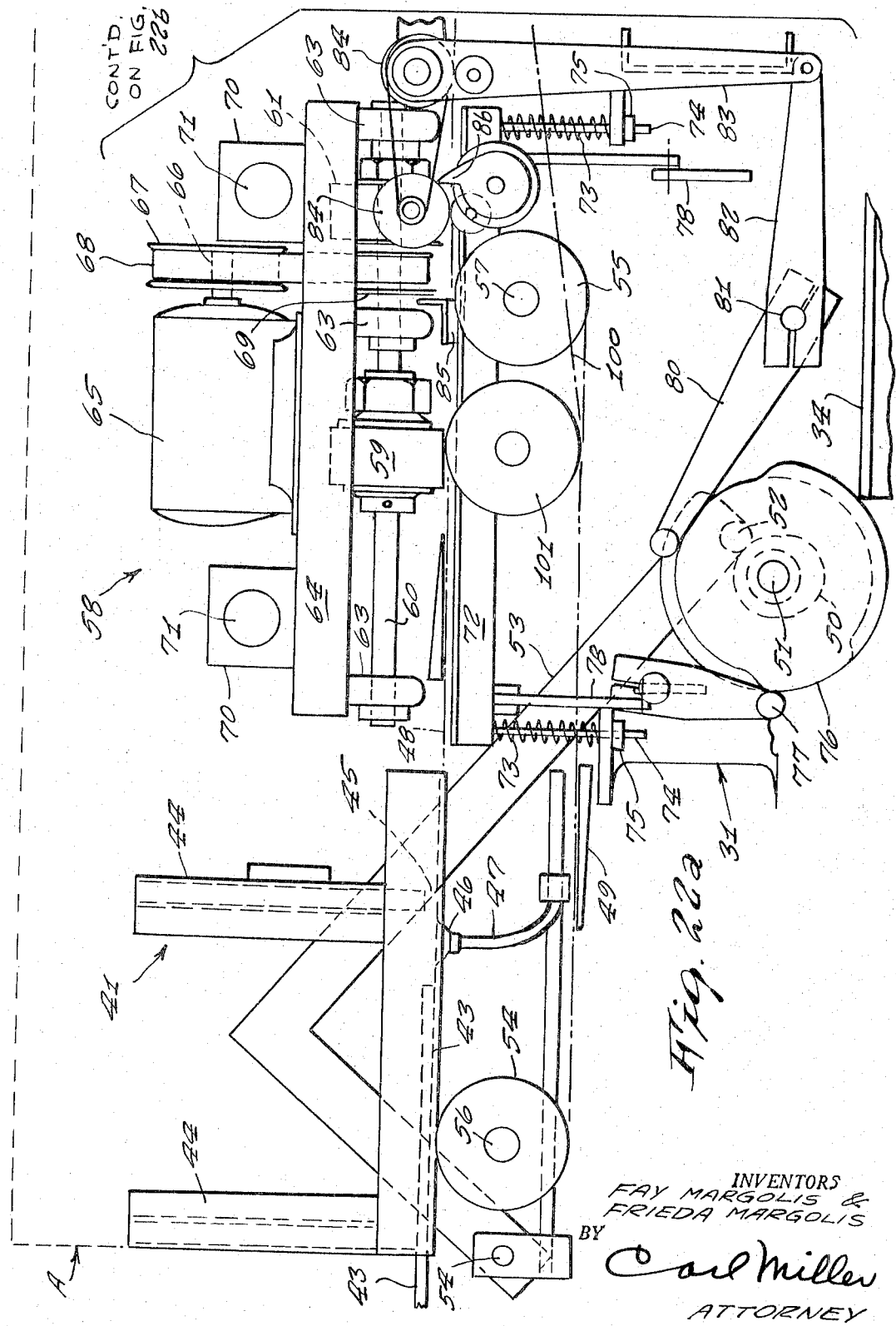
Figure 24:
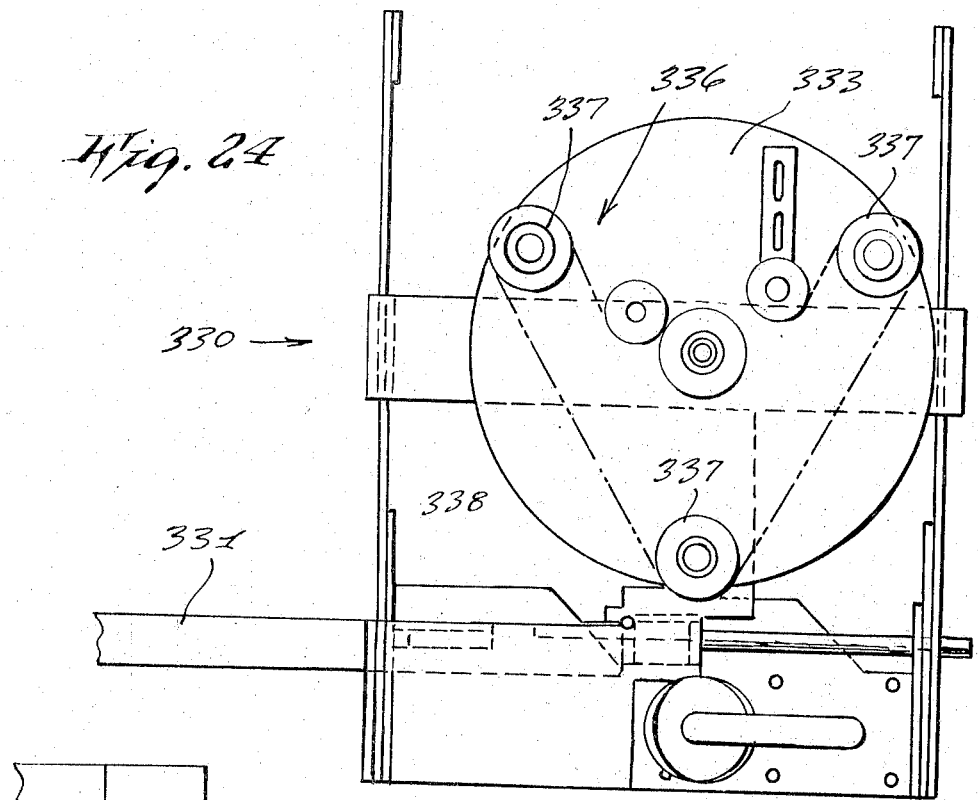
Figure 25:
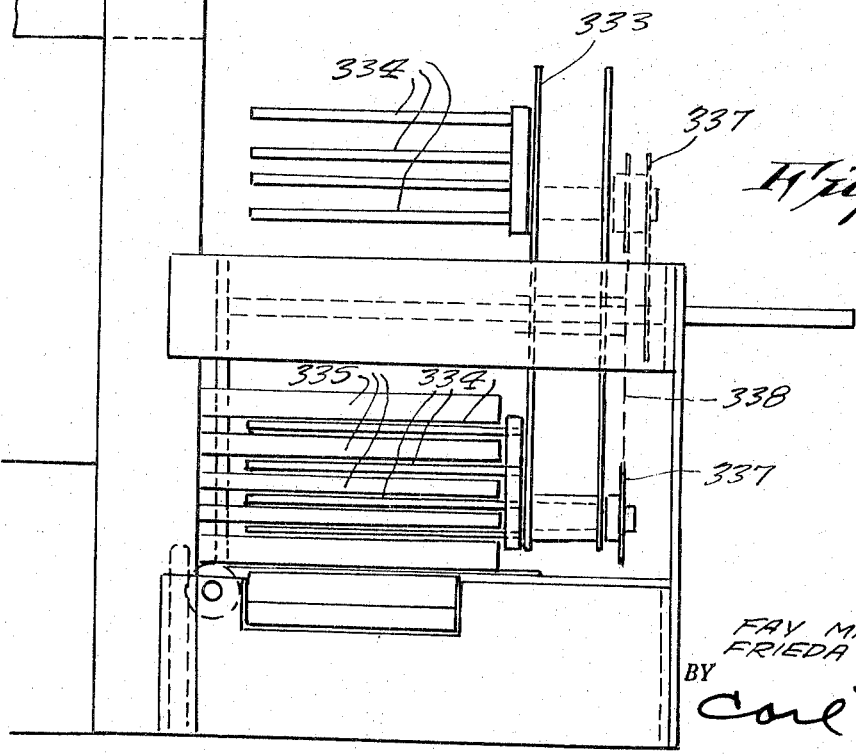

FIGURES 3 through 20 inclusive, are views showing subsequent steps or a method on the production from the sheet of cardboard to the final product and wherein:

FIGURE 3 is a perspective view of a flat case blank of relatively thin cardboard which is received into the machine;

FIGURE 4 is a perspective view of the cardboard showing the corners thereof having been notched, the side illustrated in this and subsequent figures forming the inner side of the book cover;

FIGURE 5 is a perspective view showing the cardboard being thinned in thickness by a grinding operation on the backing portion;

FIGURE 6 is a perspective view showing the upper and lower flaps being upwardly folded;

FIGURE 7 is a perspective view showing glue having been applied along the upper and lower edges;

FIGURE 8 is a perspective view showing the upper and lower flaps being folded fully over upon the glued surfaces along the upper and lower edges;

FIGURE 9 is a perspective view showing a plurality of score lines formed transversely across the cover;

FIGURE 10 is a perspective view showing additional glue having been subsequently applied to the end edges and areas adjacent the backing portion;

FIGURE 11 is a perspective view showing the crash having been applied over the backing portion and adjacent glued areas;

FIGURE 12 is a perspective view showing the end flaps being upwardly folded on score lines formed in FIGURE 9;

FIGURE 13 is a similar perspective view showing the end flaps having been fully folded over upon the front and rear outer panels of the book cover;

FIGURE 14 is a perspective view showing a folding operation along the backing area, the folding being formed along the score lines formed in FIGURE 9;

FIGURE 15 is a cross-sectional view taken on line 15—15 of FIGURE 14;

FIGURE 16 is a perspective view showing the book cover again flattened out;

FIGURE 17 is a perspective view showing adhesive having been applied to the entire surfaces of the front and rear inner flaps;

FIGURE 18 is a perspective view showing casing in adhesive upon the crash;

FIGURE 19 is a fragmentary perspective view showing the front and rear panels of the book cover being partly folded upwardly and receiving a body of book pages therebetween;

FIGURE 20 is an enlarged fragmentary end view showing the pressure sealing of the page body between the front and rear panels of the book cover;

FIGURES 21a, 21b, 21c and 21d, in combination, are a diagrammatic side elevation view of present machine shown with front supporting structure partly removed to illustrate the operative mechanism;

FIGURES 22a and 22b, in combination, are an enlarged detail side elevation diagrammatic view of the stock feed assembly, grinding mechanism assembly, and die cutting unit;

FIGURE 23 is a detailed view of a portion of the structure shown in FIGURE 21c;

FIGURE 24 is an end elevation view as viewed on line 24—24 of FIGURE 21d;

FIGURE 25 is a fragmentary side elevation view as viewed on line 25—25 of FIGURE 24;

FIGURE 26 is an enlarged detail side elevation view of portion of structure shown in FIGURE 21c;

FIGURE 27 is a cross-sectional view taken on line 27—27 of FIGURE 26; and

FIGURE 28 is a cross-sectional view taken on line 28—28 of FIGURE 26.

Referring now to the drawing in detail, the numeral 30 represents a machine for producing imitated normal hard book covers according to the present invention, wherein there is a mainframe 31 upon which the various assemblies of the machine are supported for performing the various operations illustrated in FIGURES 4 through 20 for converting the sheet of cardboard into the book cover secured upon the book body. The mainframe 31 is composed of conventional angle or channel irons, and includes a lower frame 32 upon which a plurality of upstanding legs 33 are secured, and at the upper end of legs 33, a generally horizontal upper frame 34 is supported at a level convenient for observation or periodic attention by an operator of the machine; the various assemblies being generally supported on upper frame 34.

Stock feed assembly

At one end A of the machine, there is a stock feed assembly 40 which includes a hopper 41 upon which a stack of pre-cut size stock paper 42, called case blanks, is manually placed by the operator. The stock paper is comprised of sulphite finish cardboard or other suitable stock as desired. The stock is of rectangular configuration, and is supported on an adjustable base plate 43 having an upstanding angularly configurated guide post 44 at each corner, which serve to keep the stock in a neat pile in the hopper. The guide posts 44 are adjustable for accommodating various size of stock, and there is an adjustable gate 45 at the front end of the hopper to allow the stock to feed therethrough out of the hopper. It shall be noted that the paper stock is placed into the hopper with the sized or printed side facing downward in the hopper.

The lowermost sheet of stock is seized near its forward end upon the underside by a plurality of vacuum cups 46 which are raised upwardly to meet the stock. Hoses 47 communicate between the vacuum cups and a pneumatic vacuum producing mechanism (not shown). The stock sheet is brought into the path of a pair of endless timing belts 48 upon which there are secured a plurality of rubber pushers 49.

It shall be noted that the hopper is movable vertically over the timing belts for purpose of bringing the lowermost stock sheet into the timing belt rubber pusher engagement, such vertical movement being accomplished by a cam 50 mounted on shaft 51 and moving a cam follower roller 52 on the end of a frame 53 pivotable at its opposite end on a pin 54; the hopper 41 being secured to the frame 53. The timing belts 48 pass around rollers 54 and 55 mounted on shafts 56 and 57 respectively.

The grinding mechanism assembly

The timing belts deliver the paper stock under the grinding unit 58, wherein the there is a grindstone 59 mounted movable on a shaft 60 and a grindstone 61 mounted fixedly on the shaft 60. The shaft 60 is supported in bearings 63 of a frame 64, upon which is mounted an electric motor 65 having a motor shaft 66 on which there is fixedly secured a pulley 67 over which there passes an endless belt 68. The belt 68 passes also around a pulley 69 secured fixedly on shaft 60 and delivering rotational movement to the shaft from the motor. The frame 64 is supported from blocks 70 slidable along transverse extending shafts 71.

The grinding mechanism assembly includes also an activated grinder back-up plate 72 supported above a plurality of back-up plate lifter coil springs 73, which in turn are supported on the mainframe 31. The springs are fitted over rods 74 depending from frame 64, the lower portions of which pass through openings 75 in the mainframe. A nut 75 is threadedly secured therebelow upon each of the rods 74.

A cam 76 is also mounted on shaft 51 and delivers movement through a cam follower 77 and a series of cam activated backup plate lowering levers 78 to the back-up plate.

The grinding mechanism assembly further includes a cam follower 79 on the end of a rocker arm assembly 80 pivotable about a pin 81 carrying a lever arm 82 connected pivotally free to one end of a second lever arm 83 at the upper end of which there are a plurality of activated hold-down wheels 84.

The grinding mechanism assembly further includes a rubber hold down 85 over the timing belts, and it includes also a pair of cam activated paper stock stops 86.

When the case is received in the grinding mechanism assembly, it is momentarily held while the grinding operation shown in FIGURE 5 is performed to grind out the thinned portions 87 on the backing portion of the paper blank.

Die cutting unit

The case blank is then moved forwardly on an endless conveyor belt 100 supported between rollers 101 and 102, and is delivered into a die cutting unit 99 wherein there are a pair of die cut back-up rollers 103 and 104, a plurality of arcuate knives 105 mounted on knife support rings 106, a series of upper and lower transfer rollers 107 and 108 respectively, and a knife assembly 109 mounted on a shaft 110 and carrying a plurality of long die cut knives 111 secured by clamp bars 112 within knife holders 113. The knife support rings 106 are carrier on a shaft 114 as shown in FIGURE 22b.

In this die cutting unit, the corners of the paper 42 are cut off to form the notches 115 shown in FIGURE 4.

First scoring unit

Following the above operations, the paper cardboard case 42 is delivered into a hopper 120 shown in FIGURE 21a, where it is again stacked in a pile and from where it is again withdrawn from the bottom by means of vacuum cups 121 pneumatically operated through hoses 122 communicating with a pneumatic vacuum unit (not shown). The cardboard is now brought into the path of rubber pushers 123 secured on endless conveyor chain 124, which carry the cardboard under tapered rubber members 125 and deliver it between scoring rollers 126 and 127, mounted on shafts 128 and 129 respectively. The conveyor chain is carried between rollers 130 and 131 mounted on shafts 132 and 133 respectively. The scoring rollers impress the score lines 134 shown in FIGURE 6 and additionally bend up the flaps 135a and 135b formed by the score lines; the flaps being bent upwardly 45 degrees as shown in FIGURE 6.

The scoring operation may, if preferred, include also production of the score lines shown in FIGURE 9 and accordingly four or six additional score lines as desired.

First adhesive application unit

Following the scoring operation, the case is carried on the conveyor chain to the first adhesive application unit 150 where there is an inkwell type adhesive pot 151. Adhesive is transferred from the pot to adhesive applicator bars 152 and 153 for producing the adhesive strips 154 shown in FIGURE 7. A rotating cylinder 155 on shaft 156 on the pot 151 is driven by belt 157 to discharge adhesive from the pot. A pulley 158 on the cylinder shaft 156 and a pulley 159 on shaft 160 receive the belt 157. An idler sprocket 161 supported on pin 162 secured in the main frame has peripheral notches 163 to receive pushers 123 therein, the sprocket being driven by a motor 164 which provides movement to the conveyor chain 124, and which additionally through pulley 159 provides auxiliary drive means to the adhesive pot discharge cylinder 155.

Second scoring unit

Following the above adhesive application, the conveyor chain 124 delivers the case into a second scoring unit 175, wherein there are a pair of male scoring bar rollers 176 and 177, which are mated respectively with a pair of female scoring bar rollers 178 and 179. In the second scoring unit, the score lines 180 and 181 are impressed into the case member 42 as it passes between the male and corresponding female rollers.

Back and forward flap folder units

The back flap folder 190 encountered next by the member 42 folds over the back flap 135a in a forwardly direction, while the forward flap 135b is folded back by the next folder 191. Both of the flaps are pressed down against the adhesive strip as shown in FIGURE 8.

Second adhesive application unit

A second adhesive application unit 200 is next encountered by the member 42. The unit 200 includes three adhesive pots 201 which are activated upwardly and downwardly to apply the adhesive shown in strips 202 and 203 in FIGURE 10.

A cam 204 mounted on a rotating shaft 205 transmits motion to a cam follower 206 at one end of a lever 207 secured at its other end about a pivotable pin 208. An arm 209 secured at its one end to the pin 208 is connected pivotally free at its opposite end to the lower end of a vertically slidable link 210, the upper end of which is connected to a hanger bar 211 supporting the three pots.

Crash unit assembly

As shown in FIGURE 11, after the second adhesive application, a crash member 220 is attached to the case 42. This is accomplished by the crash unit assembly 221 shown in FIGURE 21.

The crash unit assembly includes a crash feeder 222 which carries a plurality of punches 223 and co-operative dies 224 which punch out the crash members 220 from a roll of crash material that is unrolled beneath the punches 223. A Dixilon belt 225 carried around rollers 226 and 227 then moves the punched-out crash members in a reverse or "upstream" direction toward a timing gate 228 which is operated by an air cylinder 229.

An adhesive pot 230 applies adhesive for the head and tail bands. An auxiliary drive 231 operates the head and tail band adhesive pot.

The crash after moving "upstream" on the Dixilon belt 225 is delivered to a perforated vacuum wheel 232 which secures it upon the wheel periphery and carries it downwardly, then in a forwardly or "downstream" direction over the case member 42. The crash is secured to the case adhesive strips 203.

A folding horn 240 next folds over the case blank side panels 241 as shown in FIGURE 12. A pair of flattening rollers 242 and 243 next apply pressure to the case to crease down hard the flaps, as shown in FIGURE 13.

It is to be noted that immediately prior to application of the crash to the case, the case is transferred from chain conveyor 124 to a chain conveyor 250 having pushers 251 and being carried around rollers 252 and 253, and being driven by a roller 254.

After the case is delivered from the horn 240, it is no longer supported on a chain conveyor. It is received between transfer rollers 255 and 256 immediately before and after the flattening rollers 242 and 243.

Score breaking unit

The case 42 subsequently is moved from the transfer rollers to a score breaking unit 260 wherein the backing portion scoring is broken as shown in FIGURES 14 and 15.

The score breaking unit shown in FIGURE 21c and more specifically in FIGURES 26, 27 and 28, is shown to incorporate a series of pressure wheels 261, 262 and 263 mounted on separate shafts 264, 265 and 266 respectively. Each of these wheels are in longitudinal alignment and positioned over the case 42. As shown in FIGURE 26, each subsequent wheel is slightly lower in elevation than its predecessor. Below these wheels, there is a longitudinal row of recessed wheels 267 having a peripheral recess 268 between flanged portions 269. The wheels 261, 262 and 263 are received within the recesses 268 in gradually increasing amounts as is evident in FIGURE 26. Thus as the case advances between the upper wheel 264, 265 and 266, and the lower wheels 267, the scoring 180 and 181 is increasingly broken.

Subsequently, the case is flattened out again between pressure rollers 268 and 269 until it appears as shown in FIGURE 16.

Third adhesive application unit

The case is then delivered into a third adhesive application unit 275, wherein an inkwell type adhesive pot 276 incorporates a mechanism 277 driven by an activating cam 278, back-up roller 279, and including release latches 280 for pot activation and further including an air cylinder an air cushion 281. Here the casing receives the adhesive on the fly leaf areas 282 on the inner sides of the front and rear cover panels, as shown in FIGURE 17.

Casing in adhesive pot unit

A casing in adhesive pot unit 290 thereafter receives the case 42 and applies a film of adhesive 291 to the crash as is shown in FIGURE 18. This unit includes an air cylinder 292 as shown in FIGURE 21c. An auxiliary drive 293 shown in FIGURE 21c and in FIGURE 23 is provided for the casing in and flyleaf adhesive pots.

The case is now fully completed and needs only to be applied to the body of a book comprised of a plurality of pages attached together.

Heretofore, the crash bar traveled on a timing belt 295.

Casing in section

The casing now enters the casing in section 300 of the machine. Here the front and rear panels are raised as shown in FIGURE 19. A book body 301 comprised of a plurality of pages 302 fastened together and pre-trimmed is delivered into the section 300 on a conveyor belt 303 and dropped into a chute 304 (see FIGURE 21d). The case 42 travels under the chute and the book body within the chute is carried forward by pusher bars 305. The book body now drops into the case, as shown in FIGURE 19, at the point 306 indicated in FIGURE 21d. This casing in section shown in FIGURE 21d shows pusher bars 307 supported at each end by chains, and shows an escapement or timing gate 308, an incoming signature conveyor belt 309 and return belt 310. The numerals 311 and 312 designate flat belt rollers, while the numeral 313 designates a book support trough. The unit includes book guide plates 314 and an air jet 315. A chain 316 having six pushers 317 passes into the casing in section.

After the book body 301 is dropped into the case 42, the case is folded up tightly around the book body as the assembled book 318 advances along a book back support plate 319 and is delivered between hinge pressure rollers 320, which impress the case into the book body as shown in FIGURE 20. During this operation a tamper bar 340 holds the book body down tightly in the case.

Delivery unit

Then the finished book is brought into the delivery unit 330 where there is a delivery belt 331 and delivery rollers 332. The unit comprises principally a circular delivery wheel 333 having a plurality of radially equally spaced apart delivery pusher bars 334 secured to one side of the wheel. Between each pusher bar 334 there is a guide plate 335. The delivery wheel is rotated by a drive 336 including a series of sprockets 337 and chain 338.

The rotating wheel with its delivery pusher bars sweeps the finished book on to the conveyor 331 which carry the books to a station where the books may be manually gathered and packaged or boxed for shipment.

In a modified construction, a high pressure nipping system (not shown) may be inserted for purpose of better hinging immediately before the delivery unit which will perform its service upon the book prior to the book entering the delivery unit.

In operative use, the case blank 42 is inserted into the machine following which in sequence the backing is ground down at the places shown, and the corners of the blank are die cut. The flaps 135a and 135b thus formed are folded over 45° and adhesive 154 is applied along the upper and lower edges. The flaps are then folded over fully upon the adhesive, score lines are made adjacent the backing portion, adhesive applied adjacent thereto and along the front and rear side panel side edges, the crash is applied, the side panels are folded over, the backing scoring is then broken, the casing then again re-flattened, adhesive applied to the fly-leaf sides of the front and rear cover panels, adhesive applied to the crash, the front and rear panels then raised upwardly to form a pocket therebetween, into which a book body is dropped. Pressure rollers then crease the case securely to the book body. The book thus completed is brought to the delivery unit from which a conveyor belt discharges the finished books ready for packing and shipment.

The novel features and the operation of this device will be apparent from the foregoing description. While the device has been shown and the structure described in detail, it is obvious that this is not to be considered limited to the exact form disclosed, and that changes may be made therein within the scope and spirit of the invention.

Having thus set forth and disclosed the nature of this invention, what is claimed is:

1. In a machine for producing imitated normal hard book covers, the combination of a mainframe, said mainframe supporting a plurality of unit assemblies each of which sequentially perform an operation on an article to produce said imitated normal hard book cover, said unit assemblies comprising a stock feed unit for feeding a rectangular stock case blank of relatively thin cardboard material that will ultimately become said imitated normal hard book cover, a grinding unit for grinding down in thickness one side of said case blank in the vicinity that will form a backing portion, said side becoming ultimately an inner side of said cover, a die cutting unit for cutting off the corners of said case blank to form central flaps along the opposite side edges and upper and lower edges of said case blank, a first scoring unit for subsequentially bending inwardly approximately 45° the flaps along the said upper and lower edges, a first adhesive application unit for subsequentially applying adhesive along the inner side of said upper and lower edges of said case blank, back and forward flap folder units for subsequentially bending fully inward said upper and lower flaps and sealed against said adhesive, a second scoring unit for subsequently impressing score lines on said inner side along said backing portion, a second adhesive application unit for subsequently applying adhesive to said inner side adjacent said backing portion and adjacent the said side edges of said case blank, a crash unit for subsequently applying a crash over said backing portion and adhering said crash to said adhesive adjacent said backing portion, a folding horn for subsequently folding over inwardly the panels formed at the sides of said case blank and adhering said case blank side panels against said upper and lower flaps and side portions of said crash to form front and rear cover panels, a score breaking unit for subsequently breaking said score lines on said backing portion for enfolding a book body and allowing hinged movement of said front and rear cover panels, a third adhesive application unit for subsequently applying adhesive to the inner sides of said front and rear cover panels, a casing in adhesive pot unit for subsequently applying adhesive to the exposed central portion of said crash, a casing in section for subsequently placing an edge of said book body against said crash, closing said front and near cover panels against the sides of said book body and creasing the same together, thus completing the production of a book having said imitated normal hard book cover, and a delivery unit for carrying said book out of the machine.

2. The combination as set forth in claim 1, wherein said stock feed assembly comprises an adjustable hopper for supporting a stack of case blanks, mechanism for discharging one case blank at a time from said hopper, and a conveyor chain for receiving said case blank and transmitting said blank from said stock feed unit to said grinding unit.

3. The combination as set forth in claim 2, wherein said grinding unit comprises a plurality of grindstones, one of said grindstones being fixed on a shaft and the other of said grindstones being movable on said shaft, motor means for providing rotational drive to said shaft, an activated grinder back-up plate and means for vertically moving said activated grinder back-up plate for delivering said case blank to said grindstones.

4. The combination as set forth in claim 3, wherein said die cutting unit comprises a pair of die cut back-up rollers, the first of said die cut back-up rollers being in engagement with a knife support ring unit and the second of said die cutting back-up rollers being in engagement with a die cut knife unit.

5. The combination as set forth in claim 4, wherein said knife support ring unit comprises a plurality of knife support rings and a plurality of small knives secured thereto.

6. The combination as set forth in claim 5, wherein said die cut knife unit comprises a pair of long die cut knives, a pair of knife holders supported on opposite sides of a cylindrical body and a pair of clamp bars securing said long die cut knives in said knife holders.

7. The combination as set forth in claim 6, wherein said first scoring unit comprises a pair of scoring rollers having means to score said case and bending upwardly 45° flaps on said case.

8. The combination as set forth in claim 7 wherein said first adhesive application unit comprises an inkwell type adhesive pot, adhesive applicator bars and drive means for transferring adhesive from said pot to said applicator bars.

9. The combination as set forth in claim 8 wherein said second scoring unit comprises a pair of male scoring bar rollers and a pair of female scoring bar rollers, each one of said male scoring bar rollers being in cooperative relationship with one of said female scoring bar rollers and means for moving said case between each of said male and female scoring bar rollers for producing a second scoring operation on said case.

10. The combination as set forth in claim 9, wherein said back flap folder unit comprises a forwardly folding member and drive means therefor.

11. The combination as set forth in claim 10, wherein said forward flap folder unit comprises a rearwardly folding member and drive means therefor.

12. The combination as set forth in claim 11, wherein said second adhesive application unit comprises a series of three activated adhesive pots, and a drive mechanism for vertically moving said pots for dispensing adhesive therefrom to said case.

13. The combination as set forth in claim 12 wherein said drive mechanism for said three activated adhesive pots comprises a cam on a motor driven shaft, a lever having a cam follower at one end engaged with said cam, the other end of said lever being secured to a pivotable pin, an arm secured at one end to said pin, the other end of said arm being connected pivotably free to the lower end of a vertically slidable link and the upper end of said link being connected to a hanger bar for supporting said pots.

14. The combination as set forth in claim 13, wherein said crash unit comprises a crash feeder for forming said crash, a vacuum wheel, a Dixilon belt for transmitting said crash from said feeder to said vacuum wheel and means for said wheel to transmit said crash to said case.

15. The combination as set forth in claim 13 wherein said crash feeder comprises a frame having means to support a roll of crash material in rolled condition, a plurality of punches carried by said frame, a plurality of dies carried by said frame, each one of said punches being in alignment for association with one of each said punches, means for said roll of crash material to unroll and pass between said punches and said dies for punching out said crash from said crash material, and said crash being deposited on said Dixilon belt for transmittal from said crash feeder to said vacuum wheel.

16. The combination as set forth in claim 15, wherein said vacuum wheel comprises a cylindrical member mounted on a rotating motor driven shaft, said vacuum wheel having a circular peripheral edge between opposite circular sides, said edge having a plurality of openings spaced equally apart and communicating with said edge and with a pneumatic vacuum source whereby vacuum pressure within each of said openings on said periphery will hold captive to said wheel a crash received from said Dixilon belt, said vacuum pressure securing said crash to said rotating wheel peripheral edge until said wheel is rotated to deliver said crash above said case, and a conveyor below said vacuum wheel for transmitting said case below said vacuum wheel.

17. The combination as set forth in claim 16, wherein said score breaking unit comprises a plurality of upper pressure wheels and a plurality of lower pressure wheels, said case passing between said upper and lower wheels, said upper wheels comprising three wheels in longitudinal alignment, said lower wheels comprising a plurality of wheels in longitudinal alignment, having a central peripheral recess bounded by a flange on each side, said upper wheels being received within said recesses of said lower wheels and each said upper wheels being received in increasing depth within said lower wheel that an adjacent wheel on one side, whereby the scores on said case are gradually increasingly broken as said case passed through said breaking unit.

18. The combination as set forth in claim 17, wherein said casing in section comprises a conveyor supported on a frame for delivering book bodies into said section, a timing gate for discharging said book bodies from said conveyor, an air jet, a chute for receiving said book bodies from said conveyor, book guide plates for delivering said book bodies to said air jet, said air jet forming a part of an air tamper for setting said book body down, a book support trough for delivering said book bodies to said cases, and a pair of hinge pressure rollers having a diametrically enlarged circumferential bead for creasing said case to said book body.

19. The combination as set forth in claim 18, wherein said delivery unit comprises a delivery wheel, drive means for rotating said wheel, a plurality of radially equally spaced apart delivery pusher bars secured to one side of said delivery wheel, a guide plate between each one of said delivery pusher bars and a conveyor belt for receiving assembled said cases and book bodies forming finished book assemblies.

20. A method for producing imitated normal hard book covers, comprising, in combination, a rectangular stock case blank of relatively thin cardboard material being fed from a stock feed unit of a machine, and having one side thereof in a vicinity that will form a backing portion ground down in thickness in a grinding unit of said machine, said side becoming ultimately an inner side of said cover, subsequently said case blank having its corners cut off in a die cutting unit of said machine so to form central flaps along the opposite side edges and upper and lower edges of said case blank, subsequently bending inwardly approximately 45° the flaps along the said upper and lower edges in a first scoring unit of said machine, subsequently applying adhesive along the inner side of said upper and lower edges of said case blank in a first adhesive application unit of said machine, subsequently folding inwardly said upper and lower flaps and sealing against said adhesive within back and forward flap folder units of said machine, subsequently score lines being impressed on said inner side along said backing portion within a second scoring unit of said machine, subsequently adhesive being applied to said inner side adjacent said backing portion and adjacent the said side edges of said case blank in a second adhesive application unit of said machine, subsequently a crash being applied over said backing portion and adhered to said adhesive adjacent said backing portion in a crash unit of said machine, subsequently side panel formed at the sides of said case blank being folded over inwardly and adhered against said upper and lower flaps and side portions of said crash within a folding horn of said machine, thus forming front and rear cover panels, subsequently the said score lines on said backing portion being broken within a score breaking unit of said machine so to enfold a book body and allow hinged movement of said front and rear cover panels, subsequently adhesive being applied to the inner sides of said front and rear cover panels within a third adhesive application unit of said machine, subsequently adhesive being applied to the exposed central portion of said crash within a casing in adhesive pot unit of said machine, and subsequently an edge of said book body being placed against said crash, closing said front and rear cover panels against the sides of said book body and creasing the same together, thus completing the production of a book having said imitated normal hard book cover, the above final operation being performed within a casing in section of said machine.

References Cited by the Examiner

UNITED STATES PATENTS

| | | | |
|---|---|---|---|
| 1,560,581 | 11/1925 | Jueng | 11—3 |
| 2,640,208 | 6/1953 | De Florez et al. | 11—3 X |
| 3,006,633 | 10/1961 | Schoenberger | 11—2 X |

LAWRENCE CHARLES, *Primary Examiner.*